(12) United States Patent
Pedersen et al.

(10) Patent No.: US 11,849,275 B2
(45) Date of Patent: Dec. 19, 2023

(54) NOISE REDUCTION METHOD AND SYSTEM

(71) Applicant: Oticon A/S, Smørum (DK)

(72) Inventors: Michael Syskind Pedersen, Smørum (DK); Jan M. De Haan, Smørum (DK); Andreas Thelander Bertelsen, Smørum (DK); Matias Tofteby Bach, Smørum (DK); Rasmus Glarborg Jensen, Smørum (DK); Franz Treue, Smørum (DK); Kåre Tais Christensen, Smørum (DK)

(73) Assignee: Oticon A/S, Smørum (DK)

( * ) Notice: Subject to any disclaimer, the term of this patent is extended or adjusted under 35 U.S.C. 154(b) by 4 days.

(21) Appl. No.: 17/502,570

(22) Filed: Oct. 15, 2021

(65) Prior Publication Data

US 2022/0038811 A1 Feb. 3, 2022

Related U.S. Application Data

(63) Continuation of application No. 16/599,880, filed on Oct. 11, 2019, now Pat. No. 11,178,480.

(30) Foreign Application Priority Data

Oct. 12, 2018 (EP) .................................. 18200120

(51) Int. Cl.
*H04R 1/10* (2006.01)
*H04R 25/00* (2006.01)
*G10L 21/0208* (2013.01)

(52) U.S. Cl.
CPC ........ *H04R 1/1083* (2013.01); *G10L 21/0208* (2013.01); *H04R 25/30* (2013.01); *H04R 25/505* (2013.01); *H04R 25/552* (2013.01); *H04R 25/554* (2013.01); *H04R 25/558* (2013.01)

(58) Field of Classification Search
CPC ...... H04R 25/30; H04R 25/48; H04R 25/604; G10L 21/0208; G10L 2225/023; G10L 2225/003
See application file for complete search history.

(56) References Cited

U.S. PATENT DOCUMENTS

| | | | |
|---|---|---|---|
| 2010/0220867 A1 | 9/2010 | Frerking et al. | |
| 2010/0274564 A1 | 10/2010 | Bakalos et al. | |
| 2012/0130660 A1* | 5/2012 | Neumeyer | G01R 31/392 320/137 |
| 2013/0156239 A1 | 6/2013 | Pedersen et al. | |
| 2013/0273862 A1 | 10/2013 | Frenzer et al. | |
| 2014/0056435 A1* | 2/2014 | Kjems | G10L 15/20 381/317 |

(Continued)

FOREIGN PATENT DOCUMENTS

EP 1 871 011 A1 12/2007

OTHER PUBLICATIONS

Extended European Search Report dated Feb. 18, 2020, for European Application No. 19202648.2.

*Primary Examiner* — Sunita Joshi
(74) *Attorney, Agent, or Firm* — Birch, Stewart, Kolasch & Birch, LLP

(57) ABSTRACT

The present disclosure provides methods and systems for reducing noise induced in one or more components in a hearing aid. The present disclosure provides methods for reducing noise induced in telecoils.

24 Claims, 12 Drawing Sheets

(56) References Cited

U.S. PATENT DOCUMENTS

| | | |
|---|---|---|
| 2014/0146976 A1 | 5/2014 | Rundle |
| 2016/0227331 A1* | 8/2016 | Roeck ................... H01Q 1/273 |
| 2018/0146307 A1 | 5/2018 | Petersen et al. |
| 2018/0249265 A1 | 8/2018 | Termeulen et al. |
| 2019/0287546 A1* | 9/2019 | Ganeshkumar ...... H04R 1/1008 |

* cited by examiner

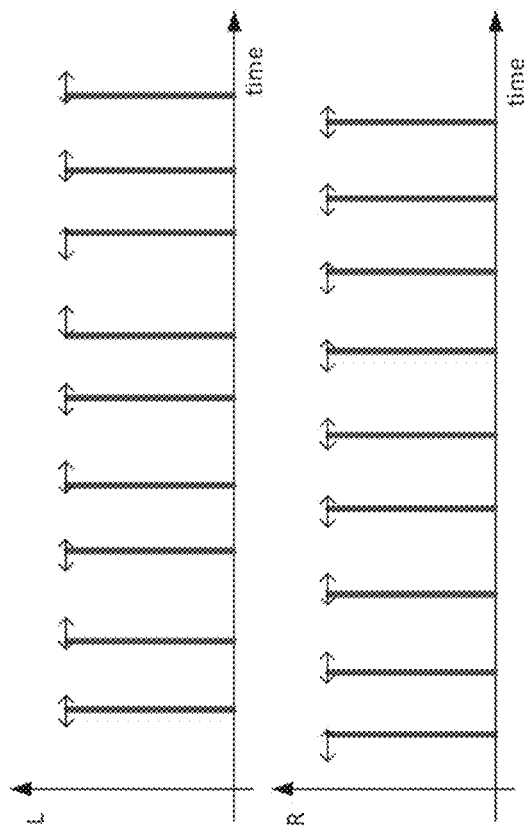
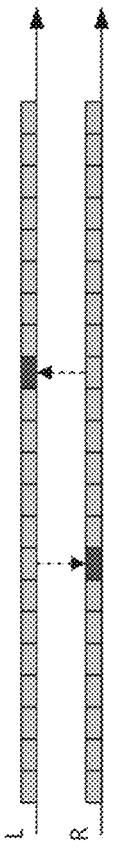
Figure 3
Figure 4

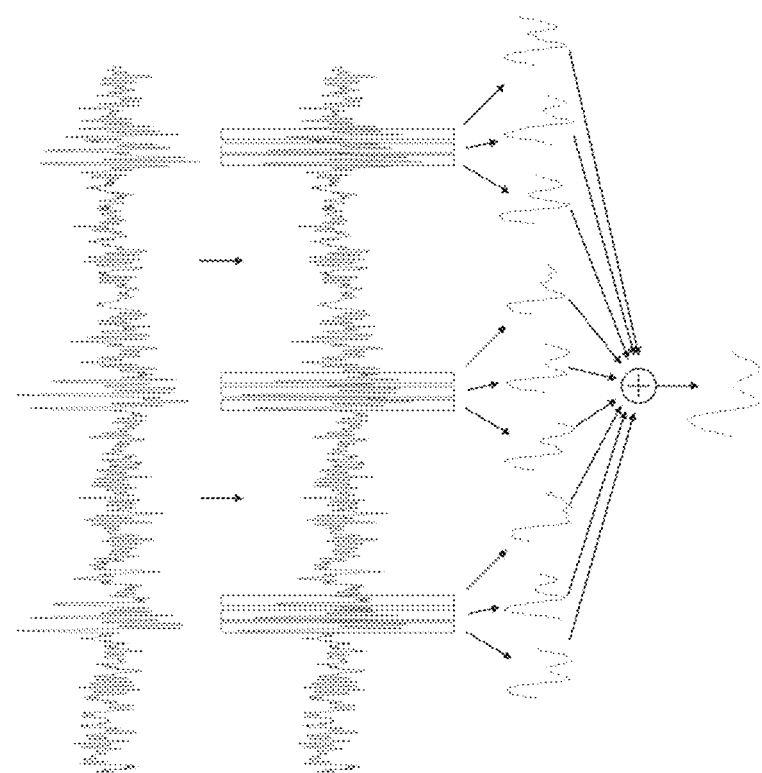

NOISE REDUCTION METHOD AND SYSTEM

CROSS-REFERENCE TO RELATED APPLICATIONS

This application is a Continuation of copending application Ser. No. 16/599,880, filed on Oct. 11, 2019, which claims priority under 35 U.S.C. § 119(a) to application Ser. No. 18/200,120.6, filed in Europe on Oct. 12, 2018, all of which are hereby expressly incorporated by reference into the present application.

FIELD

The present disclosure relates to hearing aids. More particularly, the disclosure relates to methods for reducing noise in hearing aid. Even more particular the present disclosure relates to a method for reducing noise in hearing aids where the noise is induced by an active component in the hearing aid. Still further, the present disclosure relates to methods for reducing noise in a telecoil, where the noise originates from wireless communication.

BACKGROUND

Generally, hearing aids are susceptible to noise, and such noise can propagate through the sound path and be delivered to the user, who may perceive the noise as a nuisance or in worst case can hinder the hearing impaired user in being helped to hear desired sounds.

In some instances audible noise may originate as electromagnetic interference induced in a component, such as a noise sensitive component, in the hearing aid. This could e.g. be electromagnetic signals induced in a telecoil, or in any other susceptible coils-like structure, or in other types of connection lines in the hearing aid, e.g. connection lines exposed to electromagnetic energy prior to analogue-to-digital conversion, e.g. lines coming from a microphone.

In particular noise originating from wireless communication coming into or going out from the hearing aid may be annoying to the user, therefore there is a need to provide a solution that addresses at least some of the above-mentioned problems. Also, the present disclosure provides at least an alternative to the prior art

SUMMARY

The method and device according to the present disclosure may be used for removing noise originating from advertising packages in Bluetooth, such as Bluetooth low energy, packages induced in the telecoil signal. However, other sources in the hearing instrument might as well inducing noise into especially the telecoil and other components.

The methods described in the present disclosure may be advantageously applied when the noise in the noise sensitive component is in the audible-frequency range. This may for example occur in a hearing aid equipped with both a telecoil and a Bluetooth and/or Bluetooth Low Energy system. It has been seen that especially advertising packages in Bluetooth or Bluetooth Low Energy systems causes electromagnetic noise to be induced in telecoil systems. Detecting and reducing this noise, which is audible for the user, enhances the user experience.

The present disclosure provides a signal processing method for reducing noise induced in a component of a hearing aid. The hearing aid may comprise a battery, an active component powered by the battery, a first component and a processor powered by the battery. The components powered by the battery may be powered directly or via other components. The first component may be a noise sensitive component. The processor may be configured to obtain a measure of power drain from the battery. The power drain may be based on current drain. The measure of power drain may include monitoring or measuring current to/from an active component. The method may comprise a step of operating the component so as to cause a power drain from the battery. The method may comprise a step of the processor monitoring a power usage of the battery. The method may comprise a step of the processor determining, based on the current power usage, if the component is in an active state or a non-active state. The method may include basing noise reduction on the current power usage, or an average power usage over a period of time. The noise reduction may be based on both the current power usage and a signal from the first component. Further, provided the component is determined to be in an active state, the processor may be configured to applying a noise reduction algorithm to reduce noise induced by the component into the audio input signal to the processor.

This may be advantageous to be used in a system of a single hearing aid or in a binaural hearing aid system with two hearing aids.

The present disclosure also provides a method for reducing noise in a component of a hearing aid when the hearing aid is part of a binaural system of two hearing aids. The component may be configured to provide a signal. The component is susceptible to electromagnetic noise. The two hearing aids may be configured to communicate with each other, e.g. wirelessly or wired. The method may comprise exchanging information derived from the component between the two hearing aids of the binaural hearing aid system. This allows each hearing aid to access information regarding the signal from two separate components, and thereby select to process the signal with a lesser noise component. This may be advantageous especially in systems where the noise is not present at precisely the same points in time, or least where this situation is less likely to occur. Additionally further noise reduction schemes may be employed.

The present disclosure also provides a method for reducing noise in a component of a hearing aid where a processor of the hearing aid, or a processor connected thereto, is adapted or configured to analyze the signal to detect onset of a noise causing event. This noise causing event could be the transmission of a package in a radio frequency system which causes noise to be induced in a coil or other susceptible component or lead in the hearing aid. The onset may be detected based on a comparison of a signal from the component, such as a telecoil, and an audio signal from an input transducer of the hearing aid, such as a microphone or microphone system. Alternatively, the onset may be detected based on a comparison of a signal from the component, such as a telecoil, and a similar signal from another hearing aid in the vicinity of the hearing aid, e.g. a second hearing aid in a binaural hearing aid system. Exchanging such signals between two hearing aids would allow each hearing aid to base an onset detection from the local component signal, e.g. the local telecoil signal.

The component may e.g. be a telecoil, a receiver or a microphone. These components may be especially sensitive to electromagnetic noise, and may be hard to shield physically from the electromagnetic induced noise.

An estimate of the induced noise may be predetermined and stored before being used for reducing or removing the induced noise.

The noise contribution from the supply current may be estimated by averaging over different instances of the noise An average waveform may be trained in advance or during startup of the hearing instrument, or while the hearing instrument is in a program, where the component is not used.

The method may further comprise measuring the supply current and may also include establishing an estimate of the current influencing the magnetic field in the telecoil.

The supply current or changes in the supply current may be estimated based on a measurement of a resistor or transformer or by any other current measurement techniques, such as by use of a Hall sensor Further, the present disclosure provides a hearing aid comprising a battery, an active component powered by the battery, a first component and a processor powered by the battery, the processor configured to obtain a measure of power drain from the battery, wherein the active component is configured to be operated so as to cause a power drain from the battery. The power drain may be based on current drain. The measure of power drain may include monitoring or measuring current to/from an active component. The hearing aid may be configured so that the processor is configured for monitoring a power usage of the battery, and the processor configured to determining, based on the current power usage, if the component is in an active state or a non-active state, and provided the component is determined to be in an active state, the processor is configured to applying a noise reduction algorithm to reduce noise induced by the active component into an audio input signal provided from the first component to the processor. Such a hearing aid may provide an improved noise reduction and/or noise immunity when the user is listening to a signal originating from the first component.

The active component may include a radio frequency transceiver. This may e.g. be a Bluetooth and/or a Bluetooth Low Energy based system, or even a proprietary based system. Further, the hearing aid may include several active components, such as multiple radio frequency transceivers and/or reception devices and/or other active components such as a sound processor and/or sound amplifier.

The first component may be at least one of a coil, a telecoil, or a microphone. Inducing electromagnetic noise in one or more of these components may cause the noise to be audible to the user, as these components usually in some way provide an input signal representing a sound that the user is to be presented with.

The features and steps described herein may be combined as appropriate.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

FIGS. 1 to 24 disclose various method steps and signals at different instances in time and systems.

DETAILED DESCRIPTION

Figure 1:
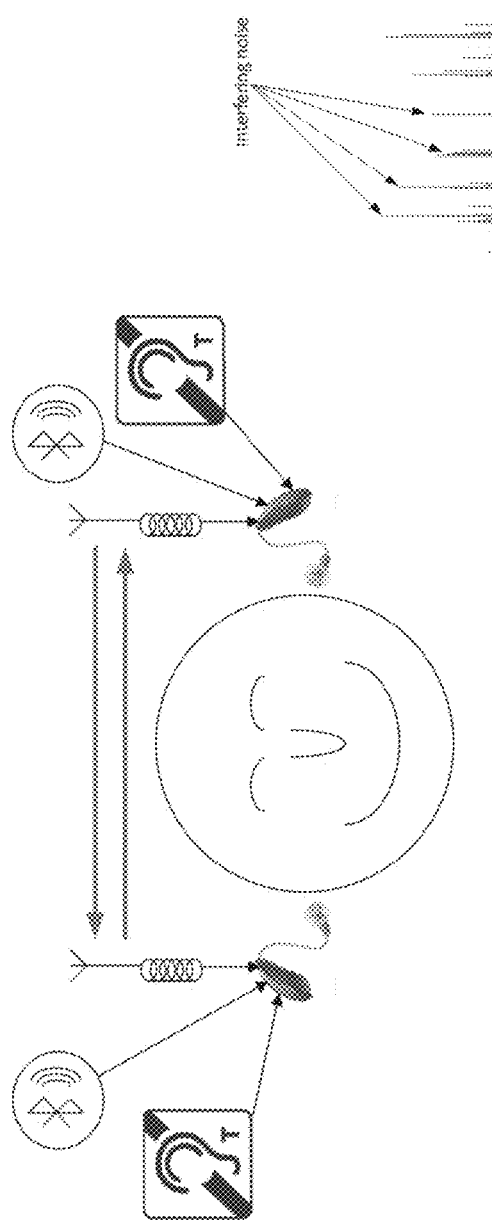

The detailed description set forth below in connection with the appended drawings is intended as a description of various configurations. The detailed description includes specific details for the purpose of providing a thorough understanding of various concepts. However, it will be apparent to those skilled in the art that these concepts may be practised without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include microprocessors, microcontrollers, digital signal processors (DSPs), field programmable gate arrays (FPGAs), programmable logic devices (PLDs), gated logic, discrete hardware circuits, and other suitable hardware configured to perform the various functionality described throughout this disclosure. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

A hearing aid may be adapted to improve or augment the hearing capability of a user by receiving an acoustic signal from a user's surroundings, generating a corresponding audio signal, possibly modifying the audio signal and providing the possibly modified audio signal as an audible signal to at least one of the user's ears. The "hearing aid" may further refer to a device such as an earphone or a headset adapted to receive an audio signal electronically, possibly modifying the audio signal and providing the possibly modified audio signals as an audible signal to at least one of the user's ears. Such audible signals may be provided in the form of an acoustic signal radiated into the user's outer ear, or an acoustic signal transferred as mechanical vibrations to the user's inner ears through bone structure of the user's head and/or through parts of middle ear of the user or electric signals transferred directly or indirectly to cochlear nerve and/or to auditory cortex of the user.

The hearing aid is adapted to be worn in any known way. This may include i) arranging a unit of the hearing aid behind the ear with a tube leading air-borne acoustic signals into the ear canal or with a receiver/loudspeaker arranged close to or in the ear canal such as in a Behind-the-Ear type hearing aid, and/or ii) arranging the hearing aid entirely or partly in the pinna and/or in the ear canal of the user such as in a In-the-Ear type hearing aid or In-the-Canal/Completely-in-Canal type hearing aid, or iii) arranging a unit of the hearing aid attached to a fixture implanted into the skull bone such as in Bone Anchored Hearing Aid or Cochlear Implant, or iv) arranging a unit of the hearing aid as an entirely or partly implanted unit such as in Bone Anchored Hearing Aid or Cochlear Implant.

A "hearing system" refers to a system comprising one or two hearing aids, and a "binaural hearing system" refers to a system comprising two hearing aids where the devices are adapted to cooperatively provide audible signals to both of the user's ears. The hearing system or binaural hearing system may further include auxiliary device(s) that communicates with at least one hearing aid, the auxiliary device affecting the operation of the hearing aids and/or benefitting from the functioning of the hearing aids. A wired or wireless communication link between the at least one hearing aid and the auxiliary device is established that allows for exchanging information (e.g. control and status signals, possibly audio signals) between the at least one hearing aid and the auxiliary device. Such auxiliary devices may include at least one of remote controls, remote microphones, audio gateway devices, mobile phones, public-address systems, car audio systems or music players or a combination thereof. The audio gateway is adapted to receive a multitude of audio signals such as from an entertainment device like a TV or a music player, a telephone apparatus like a mobile telephone or a computer, a PC. The audio gateway is further adapted to select and/or combine an appropriate one of the received audio signals (or combination of signals) for transmission to the at least one hearing aid. The remote control is adapted to control functionality and operation of the at least one hearing aids. The function of the remote control may be implemented in a SmartPhone or other electronic device, the SmartPhone/electronic device possibly running an application that controls functionality of the at least one hearing aid.

In general, a hearing aid includes i) an input unit such as a microphone for receiving an acoustic signal from a user's surroundings and providing a corresponding input audio signal, and/or ii) a receiving unit for electronically receiving an input audio signal. The hearing aid further includes a signal processing unit for processing the input audio signal and an output unit for providing an audible signal to the user in dependence on the processed audio signal.

The input unit may include multiple input microphones, e.g. for providing direction-dependent audio signal processing. Such directional microphone system is adapted to enhance a target acoustic source among a multitude of acoustic sources in the user's environment. In one aspect, the directional system is adapted to detect (such as adaptively detect) from which direction a particular part of the microphone signal originates. This may be achieved by using conventionally known methods. The signal processing unit may include amplifier that is adapted to apply a frequency dependent gain to the input audio signal. The signal processing unit may further be adapted to provide other relevant functionality such as compression, noise reduction, etc. The output unit may include an output transducer such as a loudspeaker/receiver for providing an air-borne acoustic signal transcutaneously or percutaneously to the skull bone or a vibrator for providing a structure-borne or liquid-borne acoustic signal. In some hearing aids, the output unit may include one or more output electrodes for providing the electric signals such as in a Cochlear Implant.

FIG. 1 shows a hearing aid system comprising different communication systems. The hearing aid system includes of two hearing instruments as a binaural hearing aid system.

Each instrument have at least three different communication systems: A magnetic inductive link for communication over short distances (such as binaural communication), an Radio Frequency (RF) system (Bluetooth Low Energy (BLE)) link for communication with other devices (such as a mobile phone), and a telecoil for picking up an electromagnetic field from a loop system.

Figure 2:
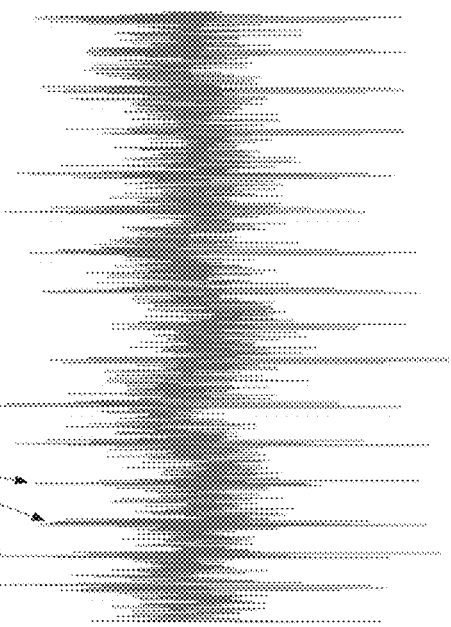

The electromagnetic field picked up by the telecoil is then converted into a sound which is presented to the listener. One problem with these closely spaced communication systems is that they may interfere with other. In particular, the signal received by the telecoil may be polluted by noise from the RF system, e.g. while the RF system is transmitting advertising packages or the like. Such an interfering noise signal is shown in FIG. 2. The advertising noise is periodic, but with some random jittering.

In addition to the above shown communication systems, the hearing aid system may as well include an FM receiver, or be connected to one via an adaptor.

FIG. 2 illustrates an example of a received telecoil signal polluted by interfering noise from Bluetooth low energy advertising. The advertising noise in Bluetooth Low Energy is generally periodic with some jitter.

It may be possible to take advantage of the fact that a binaural system with two hearing aid provides two telecoil signals in the case where both hearing instruments are equipped with a telecoil. The hearing instruments are furthermore equipped with a system for transmitting and receiving audio signals between the hearing instruments.

The advertising noise is not likely to occur at the same time at both hearing instruments. As both hearing instruments receives the telecoil signal, it is likely that one of the received telecoil signals are not contaminated by the advertising noise. By exchanging the two obtained telecoil signals, each hearing instrument has access to two instances of the telecoil signal.

Hereby, it is less likely that both instances of the telecoil signal is contaminated by the advertising noise during the same time frame. This is illustrated in FIG. 3. FIGS. 3 to 7 illustrates how a possible system for telecoil noise enhancement may look like.

A general solution could be an adaptive weighted sum between the two telecoil signals. The weighted sum can be implemented in the time domain or in the frequency domain. The weighted sum may be implemented as an MVDR beamformer such as a generalized sidelobe canceler given by $Y_{TC} = C_1 - \beta C_2$, where $C_1$ is given by the sum of the two telecoil signals, and $C_2$ is given by the difference between the two microphone signals, and $$\beta = \frac{\langle C_1 C_2^* \rangle}{\langle |C_2|^2 \rangle},$$

where $\langle \ \rangle$ denotes a time average and * denotes a complex conjugation. The estimate of beta may be overruled by, or dependent on, a control signal which provides information on when the telecoil system may be contaminated by noise from the Bluetooth system. Alternatively, the averaging time constant may depend on the control signal. Hereby not only the BLE introduced noise may be attenuated but also other contributions to telecoil noise.

The Bluetooth advertising noise may be active at different times in the two hearing instruments. It is an advantage to have non-overlapping advertising noise between the two hearing instruments as it hereby may be possible to provide that at least one of the received telecoil signals at a given time frame is not contaminated by noise introduced by the Bluetooth system.

In FIG. 3, the bars illustrate the occurrence of advertising noise in a telecoil signal obtained at a left and right hearing instrument. Each occurrence is periodic with random jittering, within the time indicated by the arrows. As illustrated the occurrence of advertising noise is different at the two hearing instruments.

FIG. 4 illustrates an example showing how noise-induced time frames of the telecoil signal are substituted by 'clean' time frames obtained at the opposite instrument.

Figure 5:
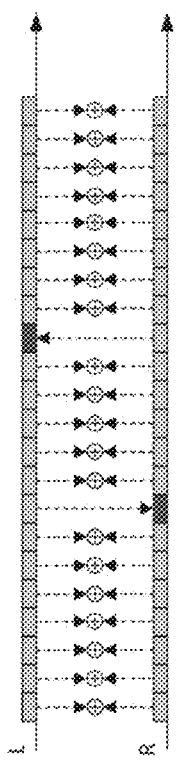

FIG. 5 illustrates an alternative to simply substituting the telecoil signal from the opposite instrument, the Figure present a combination of the left and the right telecoil signals. E.g. by a weighted sum of the two obtained signals.

Figure 6:
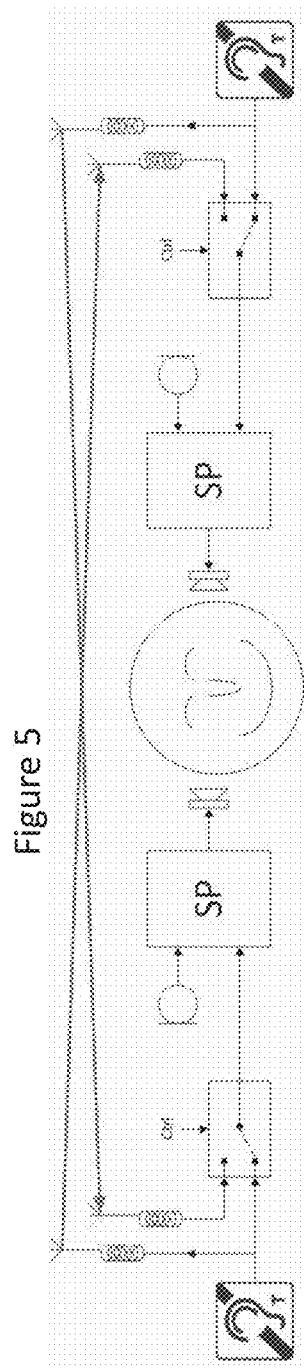

FIG. 6 is a schematic illustration of an implementation of the system shown in FIG. 4. The telecoil signals are exchanged between the two hearing instruments, and based on a control signal (ctrl) on when noise from the Bluetooth system is expected to contaminate the telecoil signal with noise, the instance of the telecoil signal without noise can be selected and presented to the listener. Preferably, the same telecoil signal is presented to both hearing instruments, more or less simultaneously. Hereby, the remaining background noise within the telecoil signal (not originating from the Bluetooth system) will not switch between being similar and different. Hereby the introduction of spatial artifacts is avoided.

Figure 7:
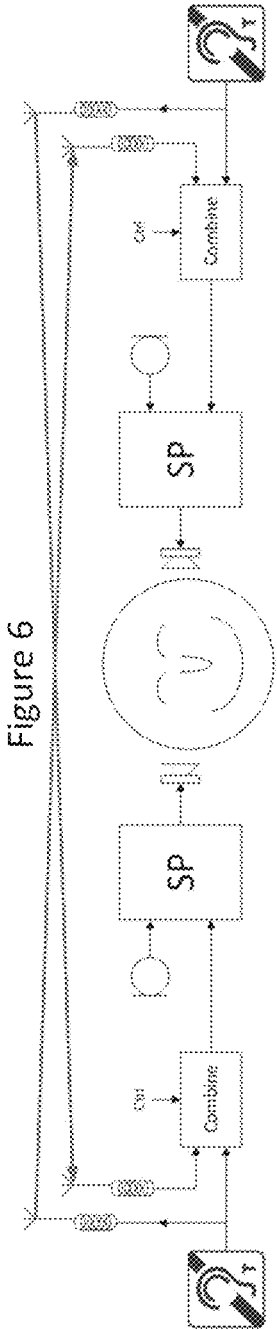

FIG. 7 illustrates a schematic implementation of the system illustrated in FIG. 5, i.e. a generalization of the proposed system shown in FIG. 6. The two telecoil signals are combined by a weighted sum. The weights may be real scalar values, the weights may be real-valued filter coefficients in the time domain or complex-valued filter coefficients in the frequency domain. The weights may be adaptive, e.g. estimated as an MVDR beamformer, The MVDR beamformer may be e.g. be implemented as a generalized sidelobe canceller.

Further, in an alternative, or combination with other methods described herein, a method may use information other than when the radio is active. Instead, the onsets of the noise may be estimated. Preferably, only onsets present in the telecoil signal, but absent in the audio signal should be estimated. This is illustrated in FIG. 8.

Figure 8:
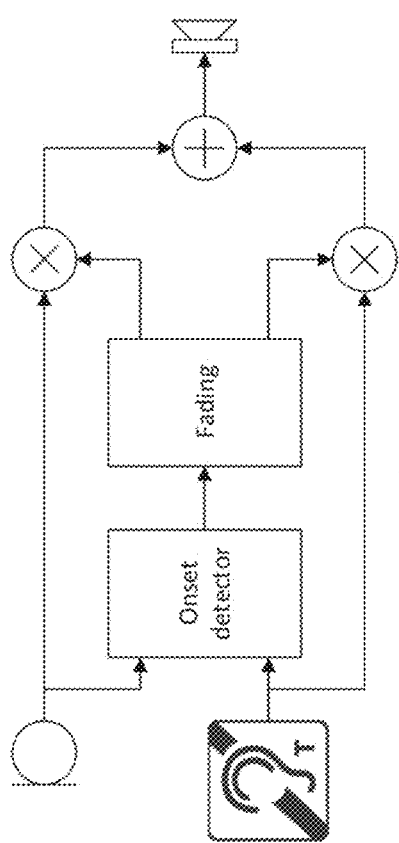

FIG. 8 schematically illustrates noisy spikes in the telecoil signal which may be detected by an onset detector. Preferably, the onset detector has access to both audio and telecoil input. The objective of the onset detector is to detect onsets present in the telecoil signal, but absent in the audio signal. Hereby, noise onsets from the Bluetooth system can be distinguished from onsets present in the audio. The resulting onset flag (or probability of onset) is used to control the fading between the telecoil signal and the audio signal).

Figure 9:
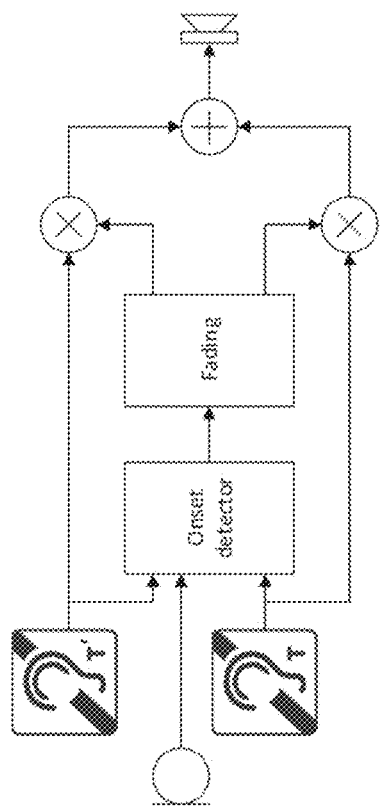

As an alternative to the local onset detection, an onset may be estimated based on both the local telecoil signal T and the telecoil signal T' obtained at the hearing instrument at the opposite ear in binaural system, however, the method may be used in a signal hearing aid without the need of a second hearing aid. As the noise induced onsets are unlikely to coincide at two hearing aids, it is possible detect, or at least estimate, the onset in both telecoil signals and fade to the telecoil signal where the onset is not present. This is illustrated in FIG. 9. The audio signal may as well be used as input to the onset detector. The detector may be implemented in the time domain or in different frequency channels.

FIG. 9 illustrates an onset which may be detected from both a locally received telecoil signal and the telecoil signal received at the opposite ear, and retransmitted to the local ear via another communication channel. The onset detector detects onsets in the telecoil signals and fade to the signal with no onset. The audio input may be used in addition to the telecoil signals to detect if the onset is present in the microphone signal as well.

A further alternative or addition provides a method using the received telecoil signal solely as a control signal. As the telecoil signal is assumed to have a higher SNR compared to the audio signal, it can be used to derive a fast-varying gain in the time-frequency domain, which can be applied to the audio signal in order to enhance the audio signal. In this way, the telecoil-signal-derived-gain becomes a vocoder (the method may work less optimal for music picked up by the telecoil). In this case, the control flag form the Bluetooth system may be used to "clean" the telecoil signal before the vocoder gain is estimated. An example drawing of this system is shown in FIG. 10.

Figure 10:
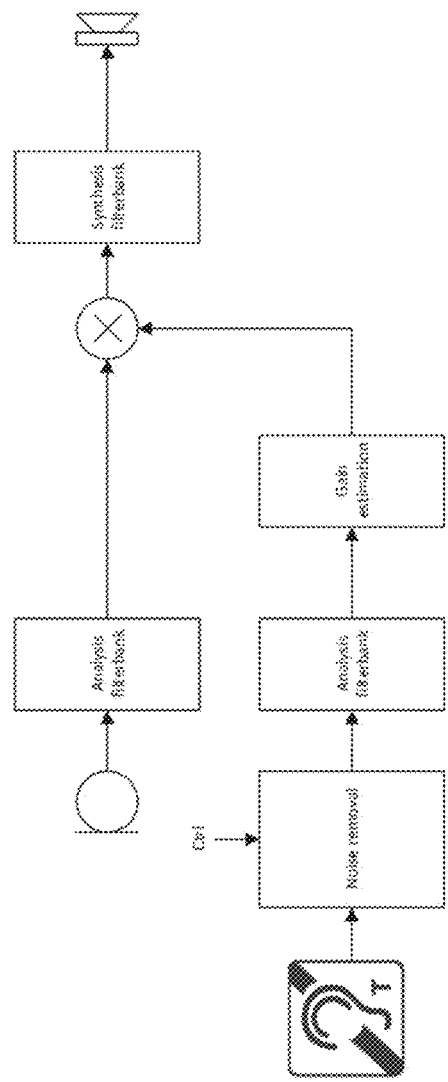

FIG. 10 illustrates a system where the telecoil signal is assumed to have a high, positive SNR, the signal can be used to enhance the microphone signal contrary to listening to the telecoil signal itself. First the noise originating from the RF system is removed using access to when the RF signal is transmitting or receiving. This can be applied in the time domain (as shown) or in the frequency domain. In the time-frequency domain (after the analysis filterbank), energetic areas of the telecoil signal can be estimated and the energetic areas can be converted into a gain applied to the microphone signal, wherein the gain preserves the energetic areas of the telecoil signal.

Figure 11:
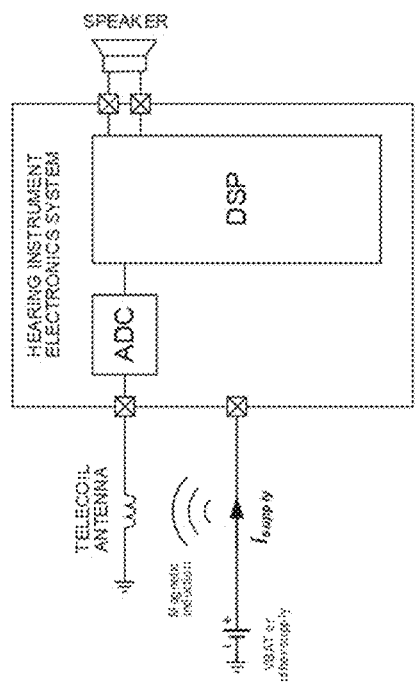

In a still further method, as either an alternative or addition the other methods disclosed herein, the method may avoid applying the information directly from the BLE system, but apply another signal for activation of telecoil noise removal. The root cause of the telecoil noise may, as outlined herein, be magnetic field due to the changes in the supply current. This is illustrated in FIG. 11. Especially when the RF system is active, the supply current will change. The advantage of measuring the supply current changes over using information on when the RF system is active is that other sources of current induced telecoil noise besides the RF system is detected as well. Furthermore, the supply current changes may have a more accurate time alignment with the telecoil artifacts than the provided FIG. 11 illustrates changes in the supply current causing telecoil noise due to the magnetic field induced in the telecoil.

By measuring the supply current, it is possible to estimate the current influencing the magnetic field in the telecoil. The supply current or the changes in the supply current can be estimated in various ways, e.g. resistor or transformer based as illustrated in FIG. 12, or by any other current measurement techniques, e.g. by use of a Hall sensor.

Figure 12A:
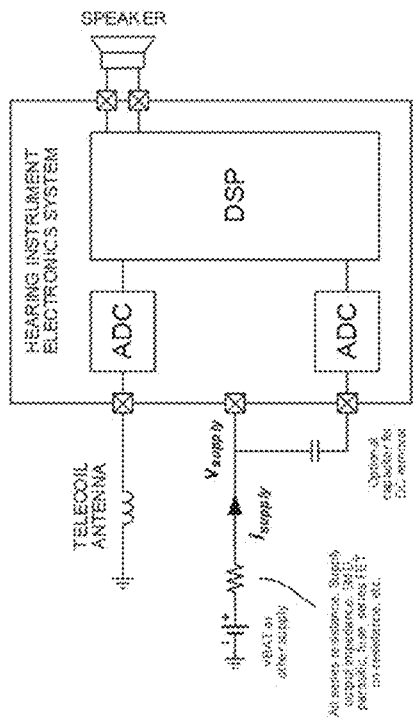
Figure 12B:
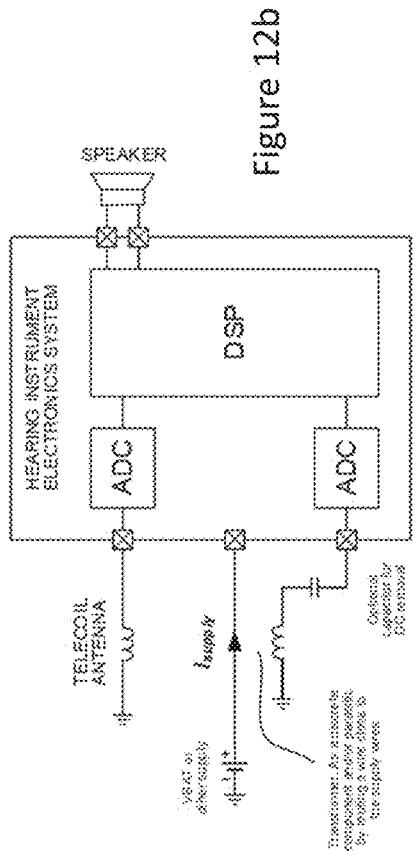

FIG. 12 illustrates current (or time-varying changes in current) in the supply wire which may be measured by a resistor or a transformer-based method or other methods. In addition to the shown methods, the current may be measured by a Hall sensor or any other current measurement technique. The DSP is used to sample the supply current and to predict the telecoil artifacts.

Figure 13:
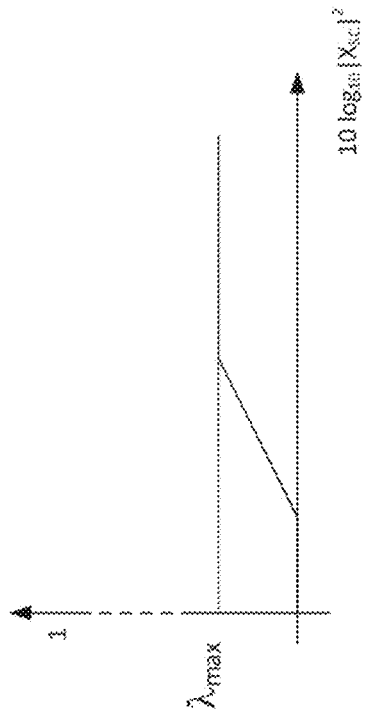

FIG. 13 illustrates a frequency domain implementation of the proposed telecoil noise removal algorithm. Assuming a linear relationship between the changes in the supply current and the magnetically induced telecoil noise, it may be possible to implement the noise removal algorithm as an MVDR beamformer using a generalized sidelobe cancelling structure. The supply current (difference), $X_{SC}(k)$ is actually a telecoil noise estimate, assumed not to include any target signal, whereas the telecoil signal $X_{TC}(k)$ includes the target signal and the magnetically induced noise. Preferably, the DC component has been removed from the supply current. The aim is to subtract a scaled and phase-aligned estimate of the noise, i.e.

$$Y(k)=X_{TC}(k)-\beta(k)X_{sc}(k)$$

This thus scale the noise estimate (i.e. the supply current) by a complex-valued factor β. It is possible to estimate beta (omitting the frequency index k) as $$\beta = \frac{\langle X_{TC} X_{SC}^* \rangle}{\langle |X_{SC}|^2 \rangle + c},$$

where * denotes the complex conjugation and $\langle \cdot \rangle$ denotes the statistical expectation operator, and c is a constant. We may e.g. implement the expectation in terms of a first order IIR filter, i.e. the expectation for $|X_{SC}(m)|^2$ may be implemented as $$\langle |X_{SC}(m)|^2 \rangle = \lambda |X_{SC}(m)|^2 + (1-\lambda) \langle |X_{SC}(m-1)|^2 \rangle,$$

where m is the frame index λ is a coefficient given by $$\lambda = 1 - e^{-1/(f_s \tau)},$$

in which $f_s$ is the frame rate and r is the time constant. Preferably the time constant r is greater than 10 milliseconds, such as greater than 100 milliseconds, such as greater than 1 second or 5 seconds. The IIR filters is preferably only updated, while the noise is present, or target is absent, i.e.

$$\langle |X_{SC}(m)|^2 \rangle = \begin{cases} \lambda |X_{SC}(m)|^2 + (1-\lambda)\langle |X_{SC}(m-1)|^2 \rangle, & \text{noise present} \\ \langle |X_{SC}(m-1)|^2 \rangle, & \text{otherwise} \end{cases}$$

The IIR filters are advantageously updated in the periods with presence of noise peaks. The IIR filters may be updated based on when the RF system is communicating. The periods where the RF system is communicating may be detected or determined based on monitoring the power drain and/or current drain. This could for instance be achieved by monitoring power consumption of one or more components in the hearing instrument. The current or power draw could be measured and/or monitored directly at the battery. The current or power draw could be measured and/or monitored directly at the active component or at components connected thereto.

Alternatively, the noise may be detected directly from the supply current signal, e.g. while the supply current is above a certain threshold. Alternatively the time constant τ or the coefficient λ may be a direct function of the supply current, e.g. as illustrated in FIG. 14.

Further alternatively, or additionally, the noise estimate may be updated based on information from the RF system, i.e. the wireless interface, either directly or via a secondary source, so that the noise reduction may be targeted and/or changed and/or enhanced and/or initiated in or around periods of time where the wireless interface is known to be active, or at least when the RF system is in advertising mode. This information, i.e. the information that the radio is intended to be active, could be used to trigger the here-in mentioned noise reduction method.

Even further, the update of the noise estimate may be based on the detector looking for clicking sounds, such as illustrated in FIG. 13.

Figure 14:
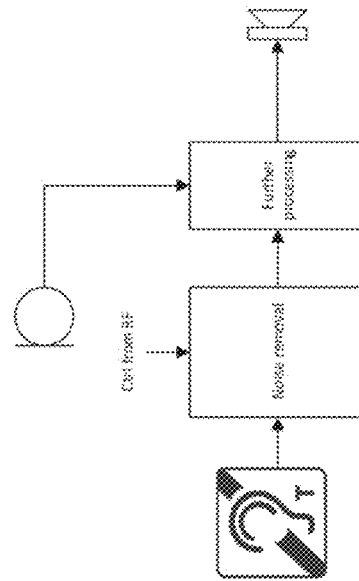

FIG. 14 illustrates the IIR filter coefficient may λ depend on the level of the supply current (with its DC component removed). At low levels, no noise is present, hence no current influences the telecoil, and the power estimate (and hereby β) is not updated as the coefficient λ is zero. At higher levels, the telecoil is influenced by the supply current, and the IIR filter is updated with the coefficient limited at the value λ_max.

As the influence of the telecoil from the supply current is different from instrument to instrument, and depend on many factors, it may be necessary to calibrate e.g. the threshold. The threshold may be estimated in controlled situations. The current may e.g. be measured in time frames, where the RF system is active. Hereby the threshold may be adjusted according to the maximum amount of variation in the measured supply current. The threshold may be depending on the type of RF signal (e.g. different TX/RX modes such as advertising signals, control signals or data exchange signals).

Figure 15:
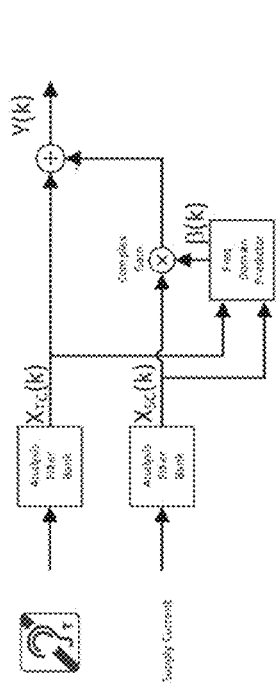

The proposed method may as well be implemented in the time domain as illustrated in FIG. 15

As another alternative to the above, it could be possible to subtract a fixed waveform, which has been estimated in advance. Subtracting a fixed waveform may be advantageous, if the relationship between the supply current and the magnetically induced telecoil is non-linear. Based on the detection of the supply current a scaled and time-aligned estimate of the supply current induced waveform received by the telecoil may be subtracted from the noisy signal. This is illustrated in FIG. 17. The noisy waveform is identified from the supply current, and for each instance of the noisy waveform, the (possibly scaled) average waveform may then be subtracted. Depending on the transceiving mode, different waveforms may be subtracted.

The average waveform may be trained in advance or during the startup of the hearing instrument, or while the hearing instrument is in a program where the telecoil is not used. The training may e.g. be based on a special RF transceiving sequence, where the telecoil signal is exposed to all types of RF-induced noise. The trained waveforms may e.g. be stored in in the instrument or in an external device. The waveforms may be stored in advance, and only the variance of the noisy signal is trained. The estimation of an average waveform is illustrated in FIG. 18. The estimation is here based on averaging (e.g. by use of a first order IIR filter) of the (time-aligned) telecoil signal frames, where the noise is identified to be active. The identification may be based on detection of the signal in the supply current or it can be based on when the RF system is active. Depending on the RF transceiving mode, different waveforms may be trained.

Figure 16:
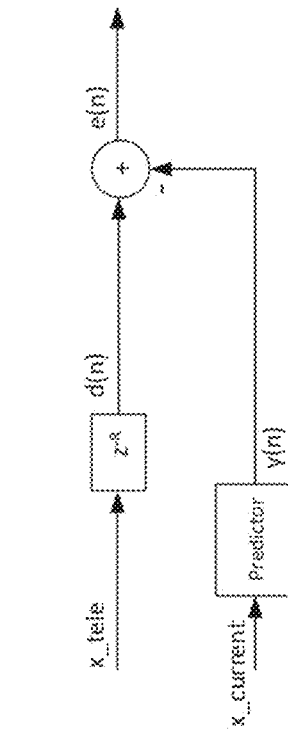

FIG. 16 is a general illustration of noise removal based on the supply current estimate. Noise removal may be applied by a gain reduction, or subtraction an estimate of the noise, e.g. obtained by a linear filtering of the supply current or obtained by subtraction of a pre-trained waveform of the estimated noise obtained by the telecoil.

FIG. 17 illustrates a situation where, from the supply current estimate, the noisy parts of the telecoil signal are identified. At each instance of identified noise, the waveform generated by the noise is subtracted from the noisy telecoil signal. Assuming the noise is caused by the RF system, different noisy waveforms can be subtracted, depending on the RF transceiving mode.

FIG. 18 illustrates the waveform of the noise contribution from the supply current that may be estimated by averaging over different instances of the noise. The instances may either be detected from the measured supply current. Alternatively, the instances may be identified by information on whether RF is active. Different waveforms may be trained based on the RF transceiving mode (e.g. advertising, data transmission, communication of control signals)

Figure 19:
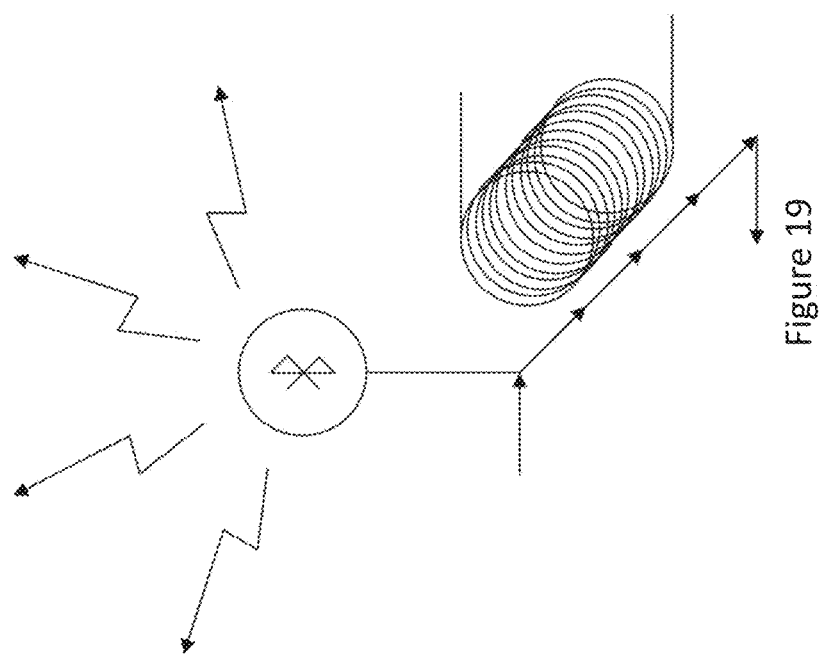

FIG. 19 illustrates an RF system positioned in the vicinity of a coil. The arrows from the RF transmitter on the left hand represent a transmitted signal, which causes a current to be induced in the coil, here a telecoil. Various mechanical arrangements may be provided to reduce the current induced in the telecoil. Such arrangements may include a screen e.g. provided at an end of the telecoil so as to reduce the flow of energy originating in connection with the RF system into the telecoil. Also, some parts of the electrical leads in the hearing aid may be arranged so as to induce a magnetic field that is orientated opposite of the electromagnetic noise originating from the RF system. This could be in the form of loops, either full loops or part of loops, or the like formed by the leads in e.g. a printed circuit board.

Figure 20:
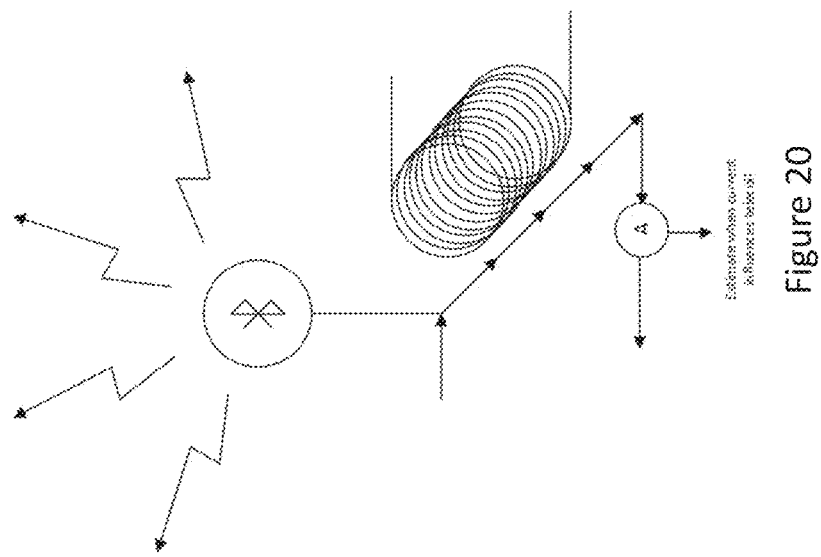

FIG. 20 is similar to FIG. 19, with the addition of a component arranged, or configured, to estimate when current is induced. As described above, this could be an arrangement where a current in a resistor or capacitor is monitored or measured, or use of another type of probe, such as a Hall probe or the like.

As the hearing aid is operated in a way that causes a power drain as explained herein, the output signal provided to the user, either as an acoustical signal from a speaker unit, as an inductive signal to an implanted part, a signal to drive a bone anchored output transducer, may be subject to noise caused by this power drain. The power drain induced noise may exhibit a pulsating pattern, which may be alleviated by the method as described in the present description. Thus, monitoring the signal driving the output transducer may trigger an update of the noise estimate. The monitoring may e.g. be performed in the sound processor or a device connected thereto.

Figure 21:
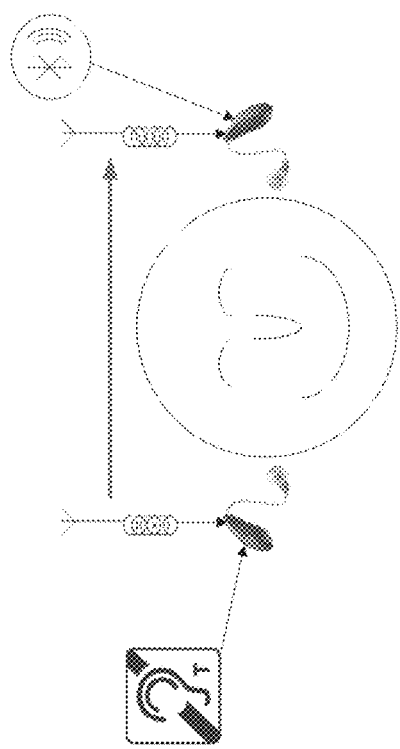

FIG. 21 illustrates the situation where the telecoil signal is only received by one hearing instrument, in which the communication unit causing noise has been disabled. The received telecoil signal is re-transmitted to the opposite (contralateral) hearing instrument via a communication link which do not cause noise in the telecoil signal, e.g. transmitted at a different frequency and/or different type of transmitter/receiver unit. In the other (the contra lateral) instrument, the communication unit causing noise in the telecoil is enabled, but the telecoil is either absent or disabled or simply ignored in the processing. Hereby a binaural hearing system comprising two hearing instruments is established where one instrument is used for receiving telecoil signals, and the other instrument may be used to receive signals from other external devices. The signals are afterwards exchanged between the instruments. Preferably using a communication channel that do not introduce (substantial) noise in the telecoil signal, such as a magnetic induction system.

In general, a communication channel used in parallel to the telecoil signal could exhibit low or no introduction of noise in the telecoil signal if it does not produce current peaks in the same manner as a Bluetooth-based system, such as a Bluetooth Low Energy based system.

Figure 22:
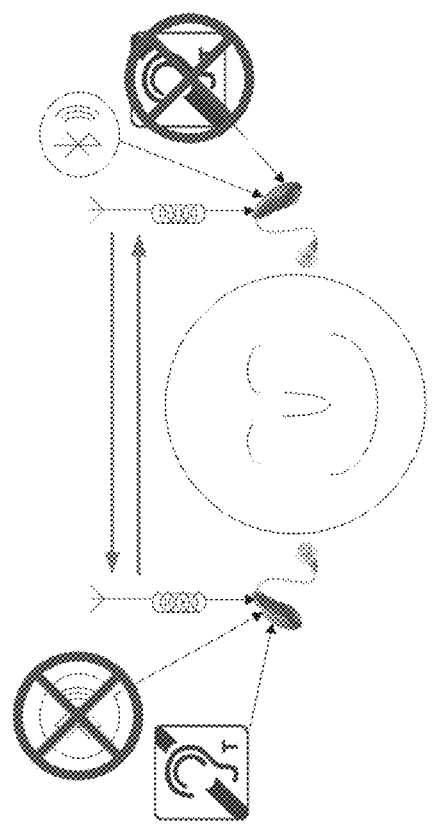

FIG. 22 illustrates a system where in one device an RF system is disable and a telecoil signal is enabled where in the other, contralateral hearing aid, an RF signal is enabled and a telecoil signal is disabled. It could be envisioned to use e.g. an inductive communication system for communicating between the two hearing aids.

Figure 24:
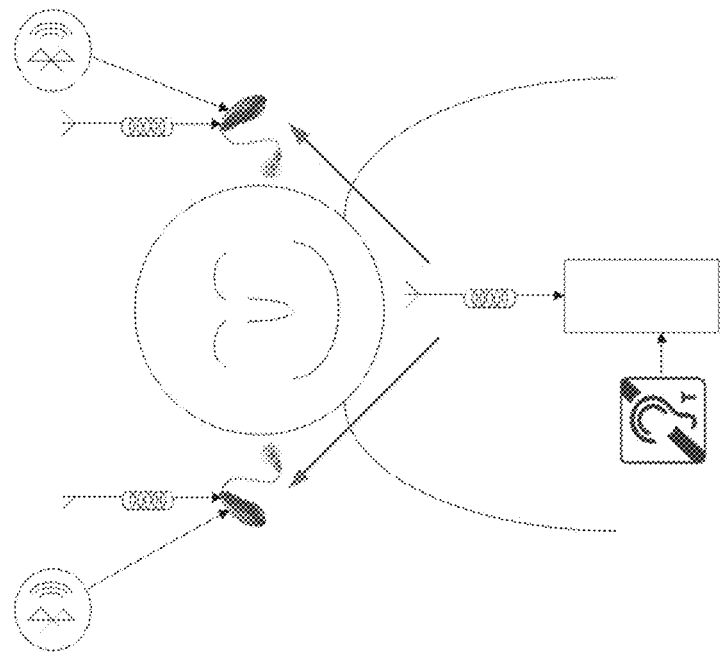
Figure 23:
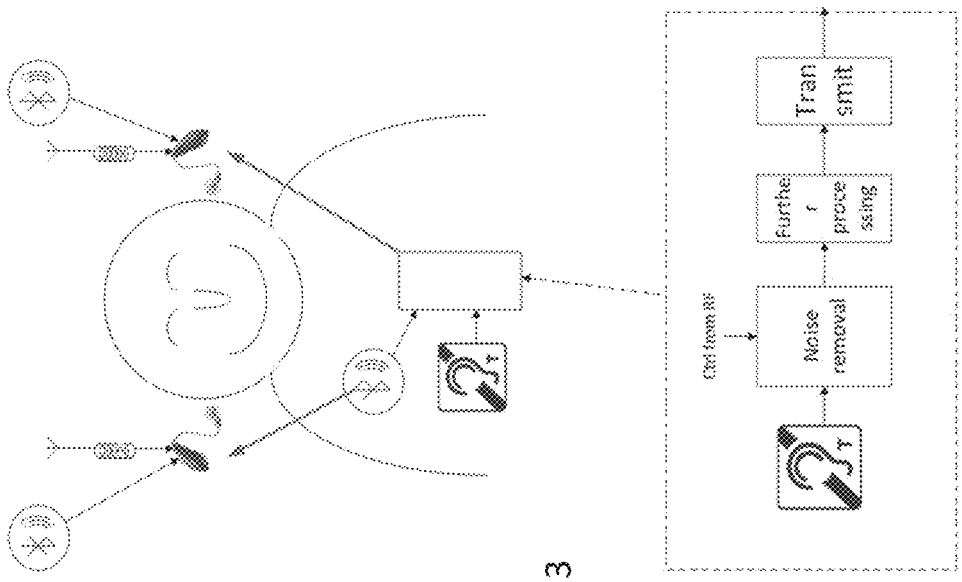

Yet another option is to place the telecoil receiver in an external device, such as illustrated in FIGS. 23 and 24, which external device is then configured to re-transmit the telecoil signal to the one or more hearing instruments. This could be done either by an RF communication method, which potentially causes noise in the telecoil in the external device, however, it is easier to place a telecoil in an external device so that it is not polluted by noise as external devices usually are much larger than hearing aid, or to transmit the signal by e.g. a magnetic link, which have been shown to exhibit lower interference to the telecoil signal.

As the hearing instrument is to be used in any environment, the hearing aid may be subject to external noise, that is, noise impinging on the device, in this context, impinging electromagnetic noise. Such externally radiated noise may be dealt with as it may corrupt or degrade the telecoil signal.

In an area with multiple persons, e.g. two or more persons, each wearing at least one hearing aid, e.g. two persons in the same room, such as a classroom, church or cinema or the like, each having at least one hearing aid, such at least two hearing aid could be configured to cooperate so that one hearing aid is configured to transmit the telecoil signal to the other hearing aid worn at the other person.

This could create a mesh-network of multiple hearing aids or external (auxiliary) devices, where the signal presented to the wearer is a combination of telecoil signals from all/both of the devices. The mesh-network could also be termed an ad-hoc network. Advantageously, the network could be created using a communication channel that did not cause noise, or at least had limited impact, in the telecoil signal.

Such a system could be contemplated to have lower transmission loss when transmitting to a neighboring hearing aid at another person compared to transmission to a contralateral hearing instrument.

One possible way of treating the telecoil signal could include replacing the signal with a random signal upon detecting a transmission even as described herein. The detection of the event by examining e.g. the power draw from the active component could prompt a processor receiving the signal from the telecoil with a replacement signal, e.g. for the duration of the event or at least for a part of the event. This replacement signal could be at a random level, or could be selected based on the level of the signal in a period prior to the event, such as within a few milliseconds or the like. The frequency content of the signal could also be at least partially random and/or selected based on telecoil signals received in a period prior to the event. The signal may be replaced by a signal having a predefined (fixed) level, or a level within a fixed interval, i.e. within a given range from a predefined center level.

When two hearing instruments, i.e. a binaural hearing system, where each hearing instrument has an active component being a radio, the two radios of the binaural hearing system may be configured so that an offset in time is established between an advertising event in the respective hearing instrument. This means that the two hearing instruments coordinate when each of them are allowed to transmit an advertising event. By timing the advertising even so that the event in the two hearing instruments do not overlap in time, at least one of the hearing instruments is able to pick up a telecoil signal not being polluted by noise from this particular event. This could also be applied to other events that occur in both hearing instruments. The offset could be defined as a fraction of the (expected) time between events. If both hearing instrument radios transmit an advertising event with a fixed time interval, and the time interval is the same for the two radios, the offset in one device relative to the other could be in the range of 1 to 90% of the time between events, such as 10 to 80%, such as 25 to 50% or other suitable interval. This is also illustrated in connection to FIG. 3.

Advantageously, one of the hearing instruments may be configured to NOT advertise, or alternate advertising, via a different communication channel, e.g. with the other device acting as a proxy for that instrument. This could eliminate the advertising noise in one hearing instrument, and this hearing instrument could then be selected as the instrument dedicated to receive telecoil signals, which are then shared with the other hearing instrument via a different communication channel.

The transmission between two hearing instruments located at respective opposite sides of the head of the user may be performed via a third, external, device, such as illustrated in FIGS. 23 and 24. In such a setup, the telecoil signal is picked up by one hearing instrument and forwarded to an external device, which then transmits the signal to the other hearing instrument. The external device may act as a reply station, simply relaying the received signal, or it may process the signal, e.g. reduce noise or process the signal in other ways, e.g. enhance intelligibility. The transmission of the telecoil signal from the hearing instrument picking up the signal may be performed via a communication channel that does not add any substantial noise to the telecoil signal, at least during the transmission of the signal from the hearing instrument to the external device. The communication channel, or medium, between the hearing instrument and the external device may be the same for the two hearing instruments, or alternatively, be two different channels or mediums.

An external device as described above may include a Bluetooth Low Energy protocol, BLE, and may include a telecoil. In such an external device, a transmission/reception flag may be raised by a wireless interface, such as flags from the BLE radio, may be used to trigger noise reduction algorithm for the telecoil signal. This could be advantageous when the external device is at least one of the elements receiving telecoil signal.

In a binaural system with an additional, auxiliary, external device, (at least) three elements in the system may include a telecoil for picking up a telecoil signal. A cleaned signal may be established from such three telecoils, possibly based on just two of the received telecoil signals. The decision on which of the signal to base an output signal, may include examining each signal for noise, such as noise from an adjacent, such as internal, radio and/or noise in the telecoil signal from other sources, such as external sources. The external noise sources could include electromagnetic noise sources.

As the noise reduction described in present disclosure is adaptive, it has the further advantage that even though the battery may appear to be symmetrical, as most batteries used in hearing aids are basically cylindrical, the current drawn from the battery may not be constant, partly due to the internal structure of the battery causing a different magnetic field to be generated, or that the current drawn from the battery may change as a function of the state of the battery, such as charge state or age or other factors, the adaptiveness of the algorithm allow for constant noise cancellation or at least noise reduction is all or most situations.

The methods described herein may be applied to hearing aids with different kinds of output transducers. The methods described herein may thus be applied to hearing aids with airborne acoustic output as well as cochlear output transducer and bone anchored hearing aids alike.

A Cochlear Implant typically includes i) an external part for picking up and processing sound from the environment, and for determining sequences of pulses for stimulation of the electrodes in dependence on the current input sound, ii) a (typically wireless, e.g. inductive) communication link for simultaneously transmitting information about the stimulation sequences and for transferring energy to iii) an implanted part allowing the stimulation to be generated and applied to a number of electrodes, which are implantable in different locations of the cochlea allowing a stimulation of different frequencies of the audible range. Such systems are e.g. described in U.S. Pat. No. 4,207,441 and in U.S. Pat. No. 4,532,930.

In an aspect, the hearing aid comprises multi-electrode array e.g. in the form of a carrier comprising a multitude of electrodes adapted for being located in the cochlea in proximity of an auditory nerve of the user. The carrier is preferably made of a flexible material to allow proper positioning of the electrodes in the cochlea such that the electrodes may be inserted in cochlea of a recipient. Preferably, the individual electrodes are spatially distributed along the length of the carrier to provide a corresponding spatial distribution along the cochlear nerve in cochlea when the carrier is inserted in cochlea.

A computer readable medium. In an aspect, the method steps may be stored on or encoded as one or more instructions or code on a tangible computer-readable medium. The computer readable medium includes computer storage media adapted to store a computer program comprising program codes, which when run on a processing system causes the data processing system to perform at least some (such as a majority or all) of the steps of the method described above, and in the claims.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

In an aspect, a data processing system comprising a processor adapted to execute the computer program for causing the processor to perform at least some, such as a majority or all, of the steps of the method described above and in the claims.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled"

to another element, it can be directly connected or coupled to the other element but an intervening elements may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. Accordingly, the scope should be judged in terms of the claims that follow.

The invention claimed is:

1. A signal processing method for reducing noise induced in a component of a hearing aid, wherein the hearing aid comprises a battery, an active component powered by the battery, a noise sensitive component providing an output signal, and a processor powered by the battery, when the active component is operated so as to cause a power drain from the battery, the method comprising:
    initiating, upon detection of the active component transitioning from an inactive state to an active state, a noise reduction processing in the processor, which is performed on the output signal from the noise sensitive component, to reduce electromagnetic noise induced by the active component, by:
    obtaining a noise-reduced version of the output signal of the noise sensitive component by subtracting a scaled noise estimate bN from a noisy version S of the output signal, where N is an estimate of the noise in the noisy version of the output signal including the electromagnetic noise induced by the active component, where b is the scaling factor given by $E(SN^*)/E(|N|^2)$, where * denotes the complex conjugation, and where $E(\ )$ denotes a statistical expectation operator.

2. The method according to claim 1, wherein the statistical expectation operator is implemented in terms of a first order IIR filter.

3. The method according to claim 1, wherein the detection of the active component transitioning from an inactive state to an active state includes monitoring power drain or usage from the battery via the processor.

4. The method according to claim 1, wherein the processor determines, based on the current power usage, if the active component is in an active state or a non-active state.

5. The method according to claim 1, wherein the noise induced in the noise sensitive component is in the audible frequency range.

6. The method according to claim 1, wherein the noise sensitive component is at least one of: a telecoil, a receiver or a microphone.

7. The method according to claim 1, wherein an estimate of the induced noise is predetermined and stored before being used for reducing or removing the induced noise.

8. The method according to claim 1, wherein a noise contribution from supply current is estimated by averaging over different instances of the noise.

9. The method according to claim 1, wherein an average waveform is trained in advance or during startup of the hearing aid, or while the hearing aid is in a program, where the active component is not used.

10. The method according to claim 1, where the statistical expectation operator is implemented as:

$$E(|N(m)|^2) = \lambda |N(m)|^2 + (1-\lambda)(|N(m-1)|^2),$$

where N is estimated over multiple frames, m is a frame index for N, and $\lambda$ is a coefficient.

11. The method according to claim 1, further comprising measuring the supply current and establishing an estimate of the current influencing the magnetic field in the noise sensitive component.

12. The method according to claim 1, wherein supply current or changes in supply current are estimated based on a measurement of a resistor or transformer or by use of a Hall sensor.

13. A hearing aid comprising a battery, an active component powered by the battery, a noise sensitive component and a processor powered by the battery, the processor configured to obtain a measure of power drain from the battery, wherein the active component is configured to be operated so as to cause a power drain from the battery,
    the processor is configured to:
        initiate, upon detection of the active component transitioning from an inactive state to an active state, a noise reduction processing in the processor, which is performed on the output signal from the noise sensitive component, to reduce electromagnetic noise induced by the active component, by:
        obtain a noise-reduced version of the output signal of the noise sensitive component by subtracting a scaled noise estimate bN from a noisy version S of the output signal, where N is an estimate of the noise in the noisy version of the output signal including the electromagnetic noise induced by the active component, where b is the scaling factor given by $E(SN^*)/E(|N|^2)$, where * denotes the complex conjugation, and where $E(\ )$ denotes a statistical expectation operator.

14. The hearing aid according to claim 13, where the processor is further configured to determine, based on the current power usage, if the component is in an active state or a non-active state.

15. The hearing aid according to claim 13, wherein the noise sensitive component is at least one of a coil, a telecoil, or a microphone.

16. The hearing aid according to claim 13, wherein the statistical expectation operator is implemented in terms of a first order IIR filter.

17. The hearing aid according to claim 13, wherein the detection of the active component transitioning from an inactive state to an active state includes monitoring power drain or usage from the battery via the processor.

18. The hearing aid according to claim 13, wherein the noise induced in the noise sensitive component is in the audible frequency range.

19. The hearing aid according to claim 13, wherein an estimate of the induced noise is predetermined and stored before being used by the processor for reducing or removing the induced noise.

20. The hearing aid according to claim 13, wherein the processor estimates a noise contribution from supply current by averaging over different instances of the noise.

21. The hearing aid according to claim 13, wherein an average waveform is trained in advance or during startup of the hearing aid, or while the hearing aid is in a program, where the active component is not used.

22. The hearing aid according to claim 13, where the statistical expectation operator is implemented as:

$$E(|N(m)|^2) = \lambda |N(m)|^2 + (1-(|N(m-1)|^2),$$

where N is estimated over multiple frames, m is a frame index for N, and $\lambda$ is a coefficient.

23. The hearing aid according to claim 13, wherein the processor is further configured to measure the supply current and establish an estimate of the current influencing the magnetic field in the noise sensitive component.

24. The hearing aid according to claim 13, wherein supply current or changes in supply current are estimated based on a measurement of a resistor or transformer or by use of a Hall sensor.

* * * * *